(12) United States Patent
Oh (10) Patent No.: US 7,898,574 B2
(45) Date of Patent: Mar. 1, 2011

(54) IMAGE PROCESSOR AND OPERATING METHOD THEREOF

(75) Inventor: Seok Byung Oh, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1532 days.

(21) Appl. No.: 11/253,571

(22) Filed: Oct. 20, 2005

(65) Prior Publication Data

US 2006/0088296 A1    Apr. 27, 2006

(30) Foreign Application Priority Data

Oct. 22, 2004 (KR) .......................... 10-2004-0084993
Jan. 14, 2005 (KR) .......................... 10-2005-0003541

(51) Int. Cl.
*H04N 5/228* (2006.01)
*H04N 5/225* (2006.01)

(52) U.S. Cl. ........................................ 348/222.1; 348/117

(58) Field of Classification Search ............... 348/231.4, 348/231.5
See application file for complete search history.

(56) References Cited

U.S. PATENT DOCUMENTS

| | | | |
|---|---|---|---|
| 5,387,943 A * | 2/1995 | Silver | 348/512 |
| 5,541,640 A | 7/1996 | Larson | |
| 6,674,803 B1 * | 1/2004 | Kesselring | 375/240.26 |
| 2003/0197790 A1 * | 10/2003 | Bae | 348/211.99 |
| 2004/0126097 A1 * | 7/2004 | Aridome | 386/98 |
| 2005/0186988 A1 * | 8/2005 | Lim et al. | 455/557 |
| 2006/0078309 A1 * | 4/2006 | Chen et al. | 386/117 |

FOREIGN PATENT DOCUMENTS

| | | |
|---|---|---|
| KR | 1998-0027646 | 7/1998 |
| KR | 1999-20289 A | 3/1999 |
| KR | 10-0222705 B1 | 7/1999 |
| KR | 10-0233937 B1 | 9/1999 |
| KR | 2003-97572 A | 12/2003 |
| KR | 2004-45382 A | 6/2004 |
| KR | 2004-85591 A | 10/2004 |

* cited by examiner

*Primary Examiner* — Luong T Nguyen
(74) *Attorney, Agent, or Firm* — Birch, Stewart, Kolasch & Birch, LLP (57) ABSTRACT

An image processor and an operating method thereof are provided. The image processor includes: an audio data processing unit having a timer for providing audio data and information about time increment thereof; an image capturing unit for generating a number of video frames through photographing; a video data processing unit for generating each of video data and information about time increment thereof using the number of video frames, and providing the video data and the information about the time increments thereof; and a memory for storing the audio data and the information about the audio time increment, the video data and the information about the video time increment.

11 Claims, 6 Drawing Sheets

IMAGE PROCESSOR AND OPERATING METHOD THEREOF

BACKGROUND

1. Field

The document relates to an image processor and an operating method thereof.

2. Description of the Related Art

An image processor generally includes a camera module for capturing an image and a display device for displaying the captured image. A charge coupled device (CCD) sensor or a complementary metal oxide silicon (CMOS) sensor may be used as the camera module, and a liquid crystal display (LCD) may be used as the display device. The camera module has been miniaturized.

Recently, such a camera module is often embedded in a portable terminal. The portable terminal with the camera module is a capable of displaying a moving picture or a still picture as well as transmitting the captured pictures to a mobile communication base station.

Recently, a camera phone was introduced and widely used. The camera phone includes a micro digital camera module to photograph a picture. Such a micro digital camera module of the potable terminal is classified into an internal camera module and an external camera module. The external camera module is separately provided from the portable terminal, and it is attached to the portable terminal. The internal camera module is integrally embedded in the potable terminal.

When a recoding function or a camcorder function is performed in such a camera phone, image data and audio data must be synchronized in time.

Figure 1:
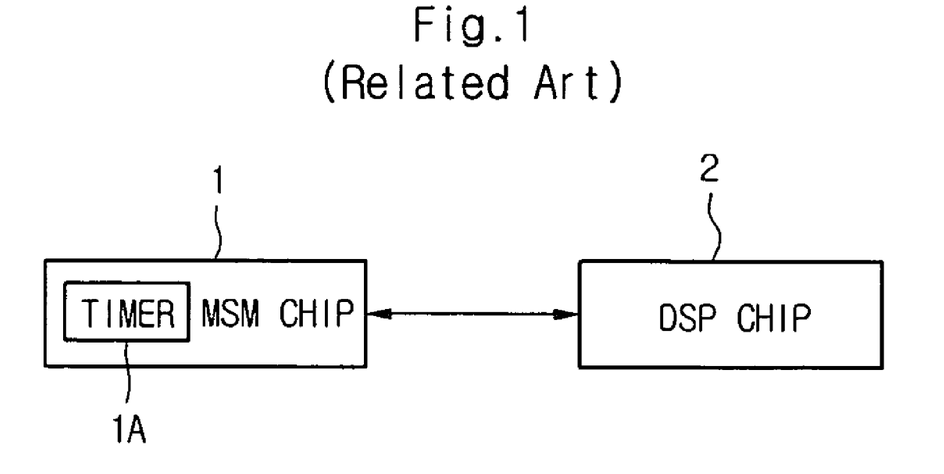
FIG. 1 is a block diagram of a portable terminal according to the related art.

FIG. 1 is a diagram illustrating a portable terminal according to the related art.

Referring to FIG. 1, the portable terminal includes a MODEM chip 1 and a digital signal processor (DSP) chip 2. The MODEM chip 1 controls general operations related to call processing and a system. Also, the MODEM chip 1 controls the DSP chip 2 that senses key inputs of a user.

For example, a mobile station MODEM (MSM) of QUALCOMM may be used as the MODEM chip 1. The QUALCOMM provides a MSM2000, a MSM2300, a MSM3000 and a MSM3100 as the MSM.

The DSP chip 2 is a digital signal processor and performs operations in response to the MODEM chip 1.

In a recoding mode of the portable terminal having the MODEM chip 1 and the DSP chip 2, the portable terminal uses a timer 1A in only one of the MODEM chip 1 and the DSP chip 2. For example, the portable terminal may use a timer 1A in the MODEM chip 1, and the DSP chip 2 synchronizes with the MODEM chip 1 receiving time information from the MODEM chip 1 having the timer 1A.

The MODEM chip 1 encodes an input audio signal and the DSP chip 2 encodes a video signal captured at the camera module. While encoding the audio signal and the video signal, the MODEM chip 1 uses time information about clocks generated from the timer 1A to encode the audio data in order to synchronize between the MODEM chip 1 and the DSP chip 2. The MODEM chip 1 transfers the audio data and an audio time increment thereof to the DSP chip 2. The audio time increment is a time for reproducing corresponding audio data.

The DSP chip 2 receives the audio data and the audio time increment and stores them in a memory. The DSP chip 2 calculates a video time increment using the received audio time increment. Herein, the video time increment is a time for reproducing the video data.

The video time increment is calculated by subtracting a sum of $1^{st}$ audio time increment to $(n-1)^{th}$ audio time increment from a total time including $n^{th}$ audio time increment, where n is a positive integer, $(n-1)^{th}$ audio time increment denotes a previous audio time increment and $n^{th}$ audio time increment denotes a current audio time increment. The DSP chip 2 stores the audio data, the audio time increment, the video data and the video time increment in the memory.

For example, if the audio time increment is set as 300 msec in the MODEM chip 1, the MODEM chip 1 transfers both of audio data and the audio time increment thereof to the DSP chip 2 every 300 msec of the timer 1A. The DSP chip 2 receives the audio data and the audio time increments thereof every 300 msec of the timer 1A, and calculates the video time increment using the audio time increment without regard to a video frame. The calculated video time increment and the video data are stored in the memory.

The video data, for example, is displayed as 15 frames per second (15 f/s). Since the audio time increment transferred from the MODEM chip 1 is 300 msec constantly, the video time increment is calculated based on the audio time increment and the calculated video time increment is stored.

However, the data may be abnormally transferred through a line connecting the MODEM chip 1 and the DSP chip 2. That is, the audio time increment may arrive at the DSP chip 2 comparatively faster or slower, or may inconstantly arrive at the DSP chip 2. Although the audio time increment is abnormally transferred, the video time increment is always calculated based on the transferred audio time increment. As a result, displaying of video frames may be interrupted, or the audio data and the video data may be not properly synchronized.

Figure 2:
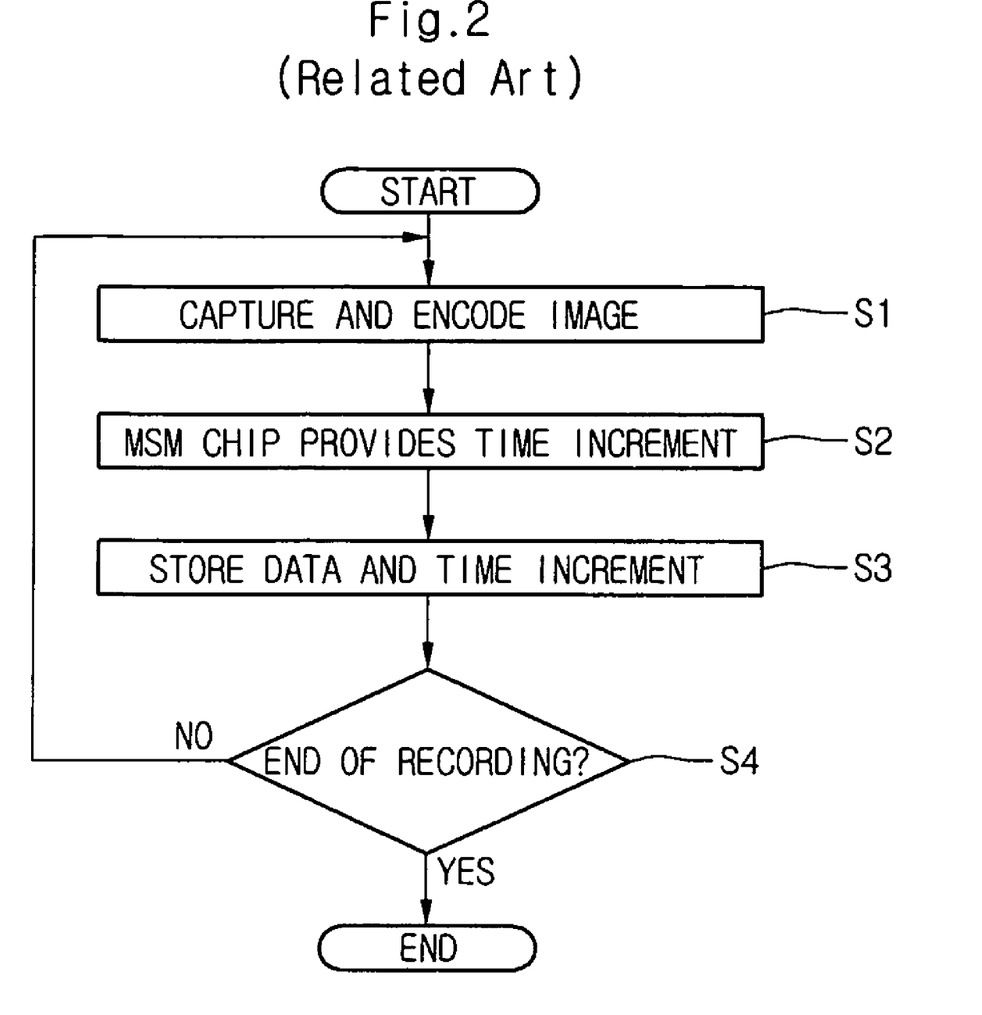
FIG. 2 is a flowchart of a method of synchronizing an audio signal and a video signal in a portable terminal according to the related art.

FIG. 2 is a flowchart of a method of synchronizing audio signal and video signal in a portable terminal according to the related art.

Referring to FIG. 2, images are captured through a camera module and the captured images are encoded in a recording mode in operation S1. In order to store the video data, the video time increment is calculated receiving the audio time increment in operation S2. The calculated video time increment and video data are stored in a memory in operation S3. Also, the audio data and the audio time increment which are transferred from the MSM chip 1 are stored.

The video time increment ($T\_{DSP\_INC}$) is a value of subtracting a previous time ($T\_{MSM\_PREV}$) from a current time ($T\_{MSM\_CUR}$) The current time ($T\_{MSM\_CUR}$) is audio time increments received until a current stage, and the previous time ($T\_{MSM\_PREV}$) is audio time increments received until a previous stage.

That is, the video time increment $T\_{DSP\_INC}$ is calculated by $T\_{MSM\_CUR} - T\_{MSM\_PREV}$.

After calculating the video time increment, it determines whether recording of image is end or not in operation S4. If not, the operation S1 is performed again. While repeatedly performing such operations, the video time increment of video data for a predetermined recoding time is stored in a memory.

In order to synchronize (Lip sync) between the audio data and the video data, the audio time increment transferred from the MODEM chip is used as a reference, and the video time increment of the DSP chip is synchronized receiving the audio time increment.

While transferring the audio time increment from the MSM chip 1 to the DSP chip 2, the audio time increment may be abnormally transferred by unexpected delay or mass-transmission of data. If the video signal is synchronized with the audio signal in this case, an interval of the video time increment of a video signal becomes irregular. As a result, the audio data and the video data may be not properly synchronized.

SUMMARY OF THE INVENTION

Accordingly, the present invention is directed to an image processor and an operating method thereof that substantially obviates one or more problems due to limitations and disadvantages of the related art.

An object of the present invention is to provide an image processor and an operating method thereof for effectively synchronizing audio data processed in an audio data processing unit and video data processed in a video data processing unit.

Another object of the present invention is to provide a portable terminal and an operating method thereof for effectively synchronizing audio data processed in an audio data processing unit and video data process in a video data processing unit in a dual chip portable terminal independently having a chip for processing an audio signal and another chip for processing a video signal.

A further another object of the present invention is to provide a portable terminal and an operating method thereof for effectively synchronizing audio data processed in an audio processing unit and video data processed in a video data processing unit in one chip portable terminal having single chip to process both of audio signal and video signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an image processor including: an audio data processing unit having a timer for providing audio data and information about time increment thereof; an image capturing unit for generating a number of video frames through photographing; a video data processing unit for generating each of video data and information about time increment thereof using the number of video frames, and providing the video data and the information about the time increments thereof; a memory for storing the audio data and the information about the audio time increment, the video data and the information about the video time increment.

In another aspect of the present invention, there is provided a method of operating an image processor including: providing audio data and information about audio time increment thereof from an audio data processing unit having a timer; providing video data and information about video time increment thereof from a video data processing unit generating each of video data and the information about time increment thereof using a number of video frames generated through photographing; and storing the audio data, the information about audio time increment, the video data and the information about the video time increment.

In a further another aspect of the present invention, there is provided a portable terminal including: a MODEM chip for generally controlling a system and a call, and providing audio data and information about audio time increment thereof; an image capturing unit for generating a number of video frames through photographing; a DSP (digital signal processor) chip for generating information about a video time increment of each video data using the number of video frames, and providing the video data and the information about the video time increment thereof; and a memory for storing the audio data, the information about audio time increment, the video data and the information about video time increment.

In a still further another aspect of the present invention, there is provided a method of operating a portable terminal including: generating video data having a number of frames per a second through photographing; encoding the generated video data and calculating a video time increment using the number of encoded video frames at a DSP chip; and storing the video data and the video time increment thereof, and audio data provided from a MODEM chip and an audio time increment thereof.

In an even further another aspect of the present invention, there is provided a portable terminal including: an AAC CODEC for providing audio data and information about audio time increments thereof; an image capturing unit for generating a number of video frames through photographing; a MPEG video CODEC for generating information about a video time increment of each video data using the number of video frames, and providing the video data and the information about the video time increment thereof; and a memory for storing the audio data and the audio time increment information, the video data and the video time increment information.

In an yet further another aspect of the present invention, there is provided a method of operating a portable terminal including: generating video data having a number of frames per a second obtained through photographing; encoding the generated video data and calculating a video time increment using the number of encoded video frames at a MPEG video CODEC; and storing the video data and the video time increment thereof, and audio data provided from an AAC CODEC and an audio time increment thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An image processor according to the present embodiment includes an image capturing unit, an audio data processing unit, a video data processing unit and a memory.

The image capturing unit generates a number of video frames per a second. For example, the image capturing unit may create 15 image frames per a second or 30 image frames per second.

The audio data processing unit includes a timer and provides audio data and information about audio time increment thereof. The video data processing unit generates information about a video time increment of each video data using the number of video frames created in the image capturing unit. The video data processing unit also provides the video data and the information about the time increment thereof.

The memory stores the audio data, the information about the audio time increment, the video data and the information about the video time increment.

According to the present invention, the information about the time increment of each video data is obtained using the number of video frames created in the image capturing unit. For example, the image capturing unit may create 15 frames or 30 frames per a second, and the information about the time increment of each video frame is calculated using the number of the video frames per a second such as 15 or 30.

Figure 3:
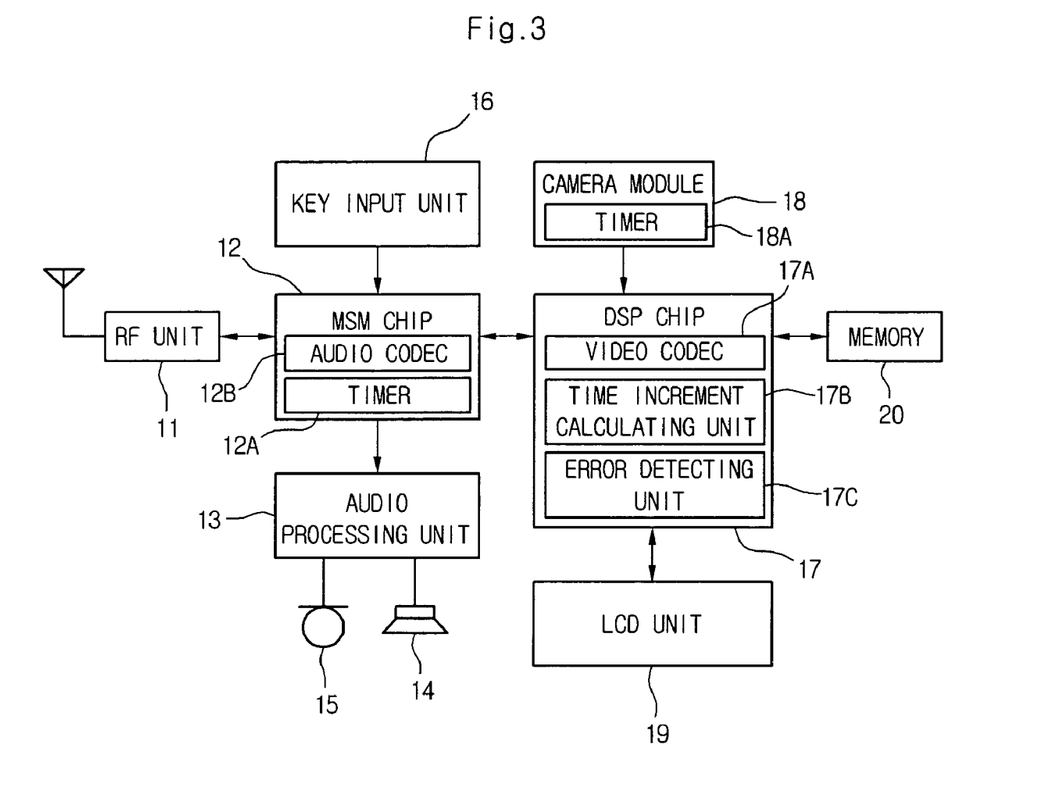
FIG. 3 is a block diagram illustrating a portable terminal according to a first embodiment of the present invention.

Hereinafter, the image processor and a method thereof according to the present invention will be described with reference FIGS. 3 to 6. FIG. 3 shows a portable terminal having two chips for processing video data and audio data as a first embodiment of the present invention and FIG. 6 is shows a portable terminal having single chip for processing both of video data and audio data as a second embodiment of the present invention.

Referring to FIG. 3, the portable terminal having dual chips according to the first embodiment of the present invention will be described at first. FIG. 3 is a block diagram of the portable terminal having dual chips.

As shown in FIG. 3, the portable terminal having dual chips according to the first embodiment includes: a radio frequency (RF) unit 11 for transmitting and receiving data through a wireless communication network; and a MSM chip 12 having a timer 12A and an audio CODEC 12B for controlling general operations for a system and call processing. The portable terminal according to the first embodiment also includes: an audio processing unit 13 for processing an input/output audio signal; a speaker 14 for inputting and outputting the audio signal; a microphone 15; a key input unit 16 having various numeral and functional keys for communication and recoding; and a DSP chip 17 having a video CODEC 17A for calculating a video time increment using the number of image frames in a recoding mode and correcting the video time increment based on a difference from the timer 12A of the MSM chip 12. Furthermore, the portable terminal according to the first embodiment includes: a camera module 18 having a timer 18A for capturing images of an object and transferring the captured images to the DSP chip 17; and a liquid crystal display 19 for displaying information and a memory 20 for storing data.

The RF unit 11 transmits and receives data through a wireless communication network. The RF unit 11 includes a RF transmitter for up-converting and amplifying a frequency of a transmitting signal, and a RF receiver for low-noise amplifying a received signal and down-converting the frequency of the received signal.

The MSM chip 12 includes a transmitter for encoding and modulating the transmitting signal, and a receiver for demodulating the receiving signal and decoding the demodulated signal. That is, the MSM chip 12 includes a MODEM and a CODEC. The CODEC includes a data CODEC for processing packet data and an audio CODEC 12B for processing audio signals such as voice.

In the present embodiment, the audio CODEC 12B may be a speech CODEC embedded in the portable terminal. Such an audio CODEC 12B encodes the audio signal.

The MSM chip 12 transfers audio data and an audio time increment to the DSP chip 12 based on time information of clocks generated in the timer 12A in a recoding mode.

The audio processing unit 13 receives audio signals outputted from the audio CODEC 12B of the MSM chip 12 and reproduces the received audio signal through the speaker 14. Also, the audio processing unit 13 receives audio signals from the microphone 15 and transfers the received audio signal to the audio CODEC 12B of the MSM ship 12.

The key input unit 16 includes keys for inputting character and text information and functional keys to set various functions. Also, the key input unit 16 may include a functional key for controlling a moving picture recording mode and an image capturing key for capturing images using the camera module according to the present embodiment. Furthermore, the key input unit 16 receives text signals composed into a moving picture signal synchronized with an audio signal.

The DSP chip 17 is a unit of processing signal or multimedia data. That is, the DSP chip 17 creates image data to display the image signals outputted from the camera module 18 on the LCD 19. The DSP chip 17 processes the image signals outputted from the camera module 18 in a unit of an image frame, and outputs the processed image data of the frames according to the size and the characteristics of the LCD unit 19. The DSP chip 17 includes a video CODEC 17A. Such a video CODEC 17A encodes the image signal according to a predetermined scheme and decodes the encoded image data to convert the encoded image data to the original image data. The DSP chip 17 also generates moving picture signals and reproduces the moving picture signals according to a predetermined mode in response to the control of the MSM chip 12.

The camera module 18 includes a camera sensor that converts optical signals sensed in a photographing mode to an electric signal, and a signal processor for converting analog image signal captured in the camera sensor to digital data. The camera sensor may be a charge coupled device (CCD) sensor. In this case, the camera sensor and the signal processor may be integrally embodied or separately embodied.

The LCD unit 19 displays an image signal outputted from the DSP chip 17 and user data outputted from the MSM chip 12. Also, the LCD unit 19 displays moving pictures reproduced in response to the DSP chip 17.

The memory 20 may include a program memory, a data memory and a moving picture data memory for storing moving pictures generated or created according to the present embodiment. The program memory stores programs for generally controlling the portable terminal and programs controlling a path of the image signal applied to the LCD unit according to the present embodiment. Also, the data memory temporary stores data created while executing the programs. The data memory may includes a text buffer for storing text signals inputted through the key input unit 16, an image buffer for storing moving picture signals generated in the video CODEC 17A, and an audio buffers for storing audio signals created in the audio CODEC 12B. The moving picture memory stores synchronized data composed of the coded image data and text signal including audio signals in the present embodiment.

Hereinafter, operations of the portable terminal according to the first embodiment will be described. The DSP chip 17 receives image signals outputted from the camera module 18. That is, when the timer 18A of the camera module 18 regularly generates clocks, the number of video frames are transferred to the DSP chip 17. For example, 15 frames or 30 frames are transferred to the DSP chip 17 for a second.

Since the DSP chip 17 receives the constant number of frames from the camera module 18, the time increment of each frame can be calculated by calculating a time of single frame. For example, if the 15 frames are transferred in a second, 67 msec is required to transfer each frame. Therefore, 67 msec is required to create single frame (1000 msec/15).

Accordingly, the time increment calculating unit 17B of the DSP chip 17 calculates the video time increment, that is, video time increment information, using the number of frames or the number of camera clocks. The calculated time increment and the video data are stored according to each of the video frames. That is, the video data is stored with the constant time increment, i.e., 67 msec, without using time information provided from the MSM chip 12.

Since the DSP chip 17 stores the video data using the video time increment calculated using the number of frames according to the preset embodiment, a lip sync difference between the audio data and the video data must be eliminated. That is, a difference value between the timer 12A of the MSM chip 12 and the timer 18A of the camera module 18 is used to correct the video time increment according to the present embodiment.

In order to correct the video time increment, the error detecting unit 17C detects a difference between the timer 18A of the camera module 18 and the timer 12A of the MSM chip 12 because the camera 18 uses the internal timer 18A to generate clocks for the number of frames. In order to detect the difference, the error detecting unit 17C compares a sum of the audio time increments transferred from the MSM chip 12 until a current stage and a sum of the video time increments until a current stage. Herein, a comparing reference is a sum of total audio time increments.

Also, the error detecting unit 17C sets an initial error correcting value as 0, and after then, the differences between two timers 12A and 18A are regularly detected at predetermined time intervals to use the detected time difference to correct the video time increment in a next correcting period.

In more specific, the error detecting unit 17C of the DSP chip 17 regularly detects a time difference between two timers 12A and 18A at a predetermined time interval. The value of the timer 12A is calculated as an accumulated sum of the audio time increments, and the value of the timer 18A is calculated as an accumulated sum of the time per a frame using the number of frames. Using the detected time difference between the two timers, a video time increment of each frame within a next correcting period is corrected.

For example, if the time difference of two timers 12A and 18A is 30 msec after 2 seconds are elapsed, that is, after 30 frames are transferred, the video time increment for next 2 seconds is calculated as 68 msec. That is, an error correcting value of 1 msec is added to the previous time increment which is 67 msec. The error correcting value of 1 msec is calculated by 30 msec/30. Herein, the 30 is the number of frames transferred for two seconds which is calculated by (15 frames per a second×2 seconds). That is, the error correcting value is obtained by multiplying the predetermined time interval and the number of frames per second, and dividing the time difference between two timers at a predetermined time interval with the multiplying result.

As described above, the error detecting unit 17C transfers the error correcting value to the time increment calculating unit 17B, and stores the corrected time increment and the video data in the memory 20.

Figure 4:
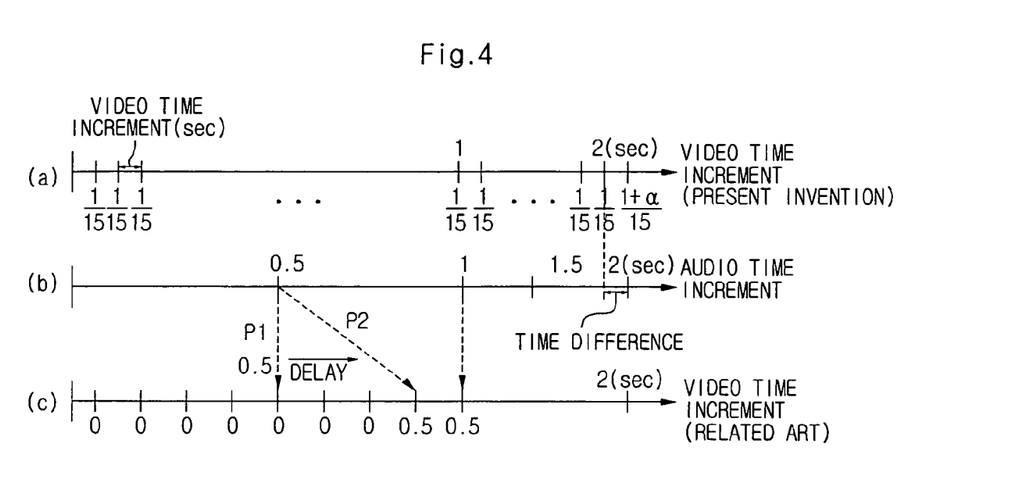
FIG. 4 is a graph comparing video and audio time increments of a portable terminal according to the present invention with those of a portable terminal according to the related art.

FIG. 4 is a graph comparing video and audio time increments of a portable terminal according to the present invention with those of a portable terminal according to the related art. In FIG. 4, a graph A denotes the time increment per each frame (1/15 sec) by calculating a time per a frame (1/15) when the 15 frames are transmitted per second.

As shown as a graph B, the audio time increment is transmitted in a time interval of 0.5 sec from the MSM chip to the DSP chip, the DSP chip can calculate the video time increment as shown in the graph A without regard to the time interval of 0.5 second, and the calculated video time increment is stored with the video data.

The video time increment of each frame according to the related art as shown in a graph C in FIG. 4 becomes irregular as much as amount of delay whenever the audio time increment is delayed.

Figure 5:
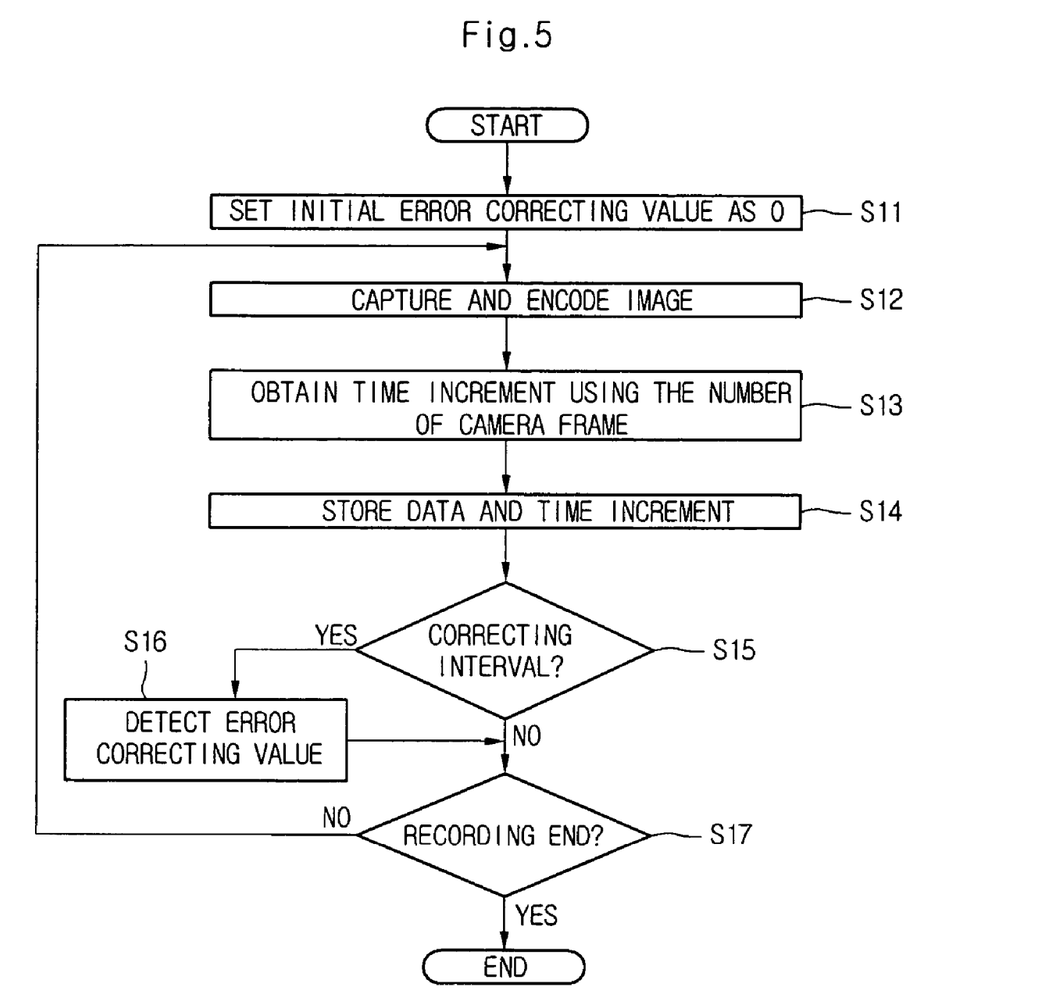
FIG. 5 is a flowchart of a method of operating a portable terminal according a first embodiment of the present invention.
Figure 6:
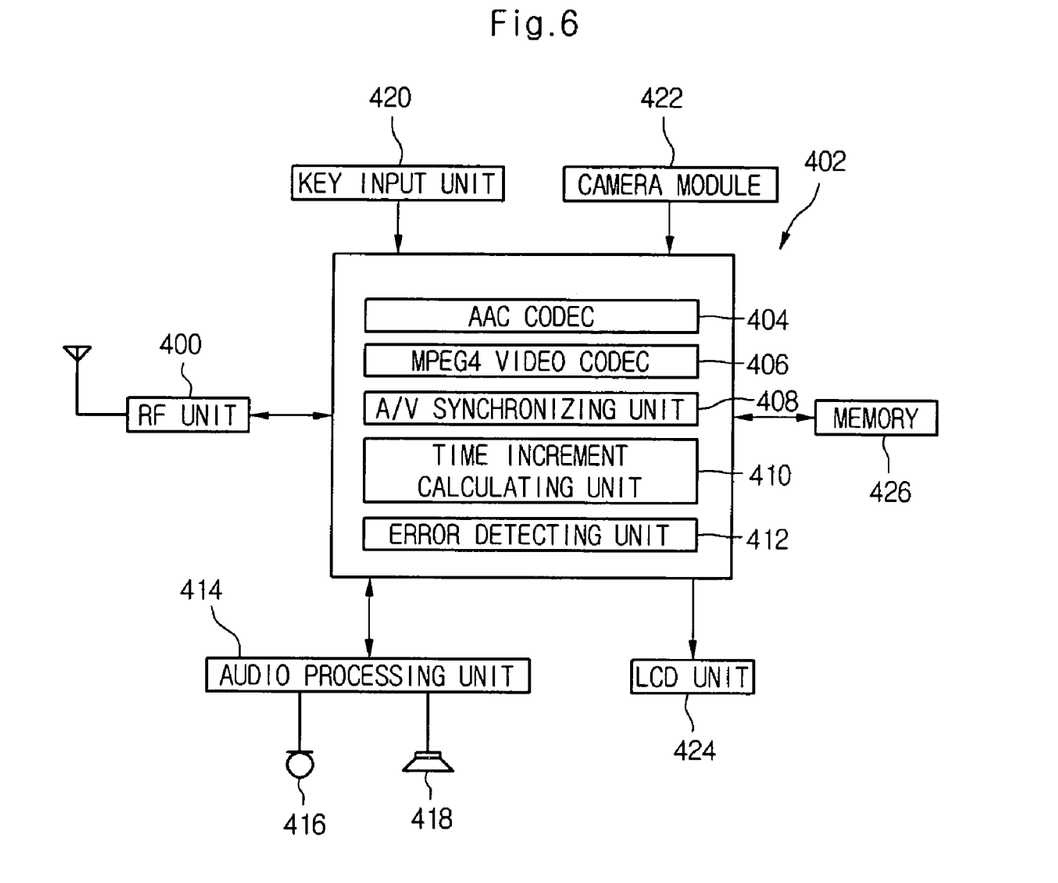
FIG. 6 is a block diagram illustrating a portable terminal according to a second embodiment of the present invention.

FIG. 5 is a flowchart of a method of operating a portable terminal according to a first embodiment of the present invention.

Referring to FIG. 5, an initial error correcting value is set as 0 in operation S11 when a recording mode of the portable terminal is began. When captured images are inputted in a unit of a number frames per second, and the inputted images are encoded in operation S12. Herein, the video data may be not encoded if a device does not encode the video data.

Using the number of image frames, the time increment of the video data is obtained in operation S13. That is, the time increment is calculated by adding the error correcting value ($\alpha$) to the time per frame ($T\_{CAM\_INC}$).

Herein, the time per a frame is obtained as 1000 msec/FPS. The FPS is the number of frames per a second. In case of 15 frames are transmitted in a second in the portable terminal according to the present invention, the time per single frame is calculated as about 67 msec or 0.067 sec by $1000/15$ or $1/15$.

The error correcting value is calculated by subtracting the time value ($T\_{MSM\_TOTAL}$) of the timer in the MSM chip from the time value ($T\_{CAM\_TOTAL}$) of the timer in the camera module and dividing the subtracting result by the number of frames per second (FPS). That is, $\alpha = (T\_{CAM\_TOTAL} - T\_{MSM\_TOTAL})/(FPS \times \text{correcting interval})$. Herein, $\alpha$ is 0.

And then, the video time increment and the video data are stored in the memory in operation S14.

At a next error correcting interval, the error correcting value is calculated in operation S15. The error correcting value is calculated using the audio time increment, the number of camera frames, and a time difference between two timers.

That is, the error correcting value is calculated by $(T\_{CAM\_TOTAL} - T\_{MSM\_TOTAL})/(FPS \times \text{correcting interval})$ in operation S16. Herein, if the number of frames per a second is 15, the correcting interval is 2 seconds and the time difference between two timers is 30 msec, the error correcting value is 1 msec calculated by 30 msec/30(=15*2).

Then, it determines whether the recoding is end or not in operation S17. If the recoding is not end, the operation S12 is performed and then the error correcting value is subtracted from the time increment using the number of frames in operation S13, and the corrected time increment and the video data are stored in operation S14.

As described above the error correcting value is detected at every correcting interval before the recoding is end. Therefore, the video time increment is repeatedly corrected after detecting the error correcting value at each correcting interval.

Herein, the correcting interval is set as a predetermined time, and the video time increment for the next correcting interval is corrected using the error correcting value.

The error correcting value is smaller than the time per a frame and has positive or negative value. That is, the error correcting value is smaller than 67 msec and the total time increment is corrected through controlling a gap between a current frame and a previous frame or a current frame and a next frame to lip synch with the audio time increment.

For example, when the camera module generates 15 frames per second, the time stamp of first 15 frames is determined as 67 msec. And then, for a second frame set from $16^{th}$ frame to $30^{th}$ frame, the time stamp is controlled according to the correcting interval. Performing the correcting of the time increments repeatedly, the synchronization between the audio signal and the video signal can be effectively and precisely processed.

As another embodiment of the present invention, the correcting of the video time increment may be performed within a predetermined time using the audio time increment. However, the correcting of the video time increment may be performed at a period calculated by subtracting a sum of times of predetermined number frames from the sum of the audio time increments. Such a correcting interval can be controlled by the DSP chip based on the audio and video time increments.

As described above, the video time increment is calculated using the number of frames per a second and stored with the video frame according to the present invention. Meanwhile, the video time increment is corrected at every correcting interval based on the audio time increment. Therefore, interruption of reproducing of the video data caused by the irregular audio time increment can be eliminated.

As a second embodiment of the present invention, a portable terminal having single chip for processing an audio data and a video data will be explained with reference to FIG. 6. In the second embodiment of the present invention, the portable terminal having single chip is used as an example. However, the present invention can be embodied into any terminal using an advanced audio CODEC (AAC) and MPEG4 video CODEC.

FIG. 6 is a block diagram illustrating a portable terminal according to a second embodiment of the present invention.

Referring to FIG. 6, the portable terminal includes a radio frequency (RF) unit 400 for wireless communication, and a DSP chip 402 having an advanced audio CODEC (AAC) 404 for compressing audio data and transferring the compressed audio data to the DSP chip 402, a MPEG4 video CODEC 406 for compressing video data and transferring the compressed video data, and an A/V synch unit 408 for synchronizing the audio data from the AAC CODEC 404 and the video data from the MPEG4 video CODEC 406.

The RF unit 400 transmits and receives data through a wireless communication network. The RF unit 400 includes a RF transmitter for up-converting and amplifying a frequency of a transmitting signal, and a RF receiver for low-noise amplifying a receiving signal and down-converting a frequency of the receiving signal.

The DSP chip 402 includes a transmitter for encoding and modulating the transmitting signal and a receiver for demodulating and decoding the receiving signal. That is, the DSP chip 402 includes an AAC CODEC 404 for transferring audio data and audio time increment, and a MPEG4 video CODEC 406 for transferring video data and video time increment.

The DSP chip 402 also includes an A/V synch unit 408 for synchronizing the audio data from the AAC CODEC 404 and the video data from the MPEG4 video CODEC 406 in a recoding mode, and a time increment calculating unit 410 for calculating an audio time increment based on time information of a clock generated from the audio data received within a regular interval, and a video time increment based on time information of a clock generated from the video data received within a regular interval.

Furthermore, the DSP chip 402 includes an error detecting unit 412 for calculating an error correcting value corresponding to a time difference comparing an accumulated sum of the audio time increments and another accumulated sum of the video time increments which are calculated in the time increment calculating unit 410, and correcting the calculated time increment at the time increment calculating unit 410.

The audio processing unit 414 reproduces a receiving audio signal outputted from the AAC CODEC 404 through a speaker 418, or transmits an input audio signal generated from a microphone 416 to the AAC CODEC 404.

The key input unit 420 includes keys for receiving numeral and text information, and functional keys for setting various functions. The key input unit 420 also includes functional key for controlling a moving picture recording mode and a photograph key for driving a camera module according to the present embodiment. Furthermore, a text signal synchronized with a synchronized moving picture signal may input through the key input unit 420.

The camera module 422 includes a camera sensor for converting an optical signal sensed during photographing to an electric signal, a signal processing unit for converting analog signals captured from the camera sensor to digital data. Herein, the camera sensor may be a charge coupled device (CCD) sensor, and the camera sensor and the signal processing unit may be integrally embodied, or separately embodied.

The LCD unit 424 is a display for displaying frame image signal outputted from the MPEG4 video CODEC 406 and displaying user data and reproduced moving picture signal outputted from the DSP chip 402.

The memory 426 includes a program memory, a data memory and a moving picture memory for storing generated or received moving picture data according to the present embodiment. The program memory stores programs for controlling general operations of the portable terminal and other programs for controlling paths of image signal supplied to the LCD unit 424. Furthermore, the data memory temporally stores data generated while performing the programs.

The data memory also includes a text buffer storing text signals inputted through the key input unit 420, an image buffer for storing moving picture signals generated from the MPEG4 video CODEC 406, and an audio buffer for storing audio signal generated from the AAC CODEC 404.

The moving picture memory stores synchronized data of encoded image data and text signals including audio signals.

In a recoding mode of the portable terminal according to the present embodiment, the MPEG4 video CODEC 406 receives an image signal outputted from the camera module 422 in a unit of a constant number of frames per a second. That is, the camera module 422 outputs a constant number of frames when a clock is generated, such as 15 frames per a second, or 30 frames per a second. Accordingly, the MPEG4 video CODEC 406 receives 15 frames or 30 frames per a second.

Since the MEPG4 video CODEC 406 regularly receives the predetermined number of frames per a second from the camera module 422, a time increment per a frame can be calculated by calculating a time of each frame. For example, if 15 frames are received per a second, the time of each frame is about 67 msec. Therefore, 67 msec is required to generate single frame.

The time increment calculating unit 410 calculates a video time increment, i.e., video time increment information, using a camera clock of a video frame or the number of frames, and the calculated time increment and the video data are stored according to each frame.

That is, the video data is stored according to the constant time increment, i.e., 67 msec, without using a time provided from the AAC CODEC 404.

Since the MPEG4 video CODEC 406 simply stores the video data according to the video time increment using the number of frames, lip synch difference between the video data and the audio data can be eliminated.

In order to eliminate the lip synch difference, the error detecting unit 412 detects a time difference between the clock of the frames of the camera module and a time included in the audio data. Herein, the error detecting unit 412 compares a sum of audio time increments until a current stage and another sum of video time increments until a current stage. Herein, the reference of the comparison is a sum of total time of the audio time increments.

The error detecting unit 412 sets an initial error correcting value as 0, and the error correcting value is corrected by detecting the time difference between the two data at every predetermined time intervals.

In other words, the error detecting unit 412 detects time difference between two data at a predetermined time interval. The time value of the audio data is calculated as an accumulated sum of the audio time increments, and the time value of the video data is calculated as an accumulated sum of times of frames using the number of camera frames.

Therefore, the video time increment of each frame is compensated at a next correcting period using the detected error correcting value based on the time difference between two data. For example, if time difference between the two data is 30 msec after two seconds are elapsed, the video time increment for next two second is calculated by adding 1 msec to 67 msec. That is, the video time increment for next two second is 68 msec.

Herein, 1 msec is calculated dividing 30 msec by 30 frames since the 30 frames are transferred for two seconds. Herein, the 30 msec is a time difference of two data at a predetermined time interval, and 30 frames is calculated by multiplying 2 second to 15 frames. That is, the error value is calculated by multiplying the predetermined time interval with the number of frames per a second, and dividing the multiplying result by the time difference between two data at a predetermined time interval.

As described above, the detected error value at the error detecting unit 412 is transferred to the time increment calculating unit 410, and the compensated time increment and the video data are stored in the memory 426.

As described above, the video time increment of each frame is calculated using the number of frames per a second, which are transmitted from the camera module, and the calculated video time increment and the video data is stored in the memory according to the present invention. Furthermore, the video time increment is corrected based on the audio time increment at every predetermined time intervals according to the present invention. Therefore, reproducing interruption of video data is eliminated by the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image processor comprising:
   an audio data processing unit having a timer for providing audio data and information on an audio time increment;
   an image capturing unit configured to generate a plurality of video frames through photographing;
   a video data processing unit configured to generate video data and information on a video time increment using the plurality of video frames;
   a memory configured to store the audio data and the information on the audio time increment, and the video data and the information on the video time increment; and
   an error detecting unit configured to detect an error between the information on the video time increment provided from the video data processing unit and the information on the audio time increment provided from the audio data processing unit, and perform a correcting operation regularly,
   wherein the error detecting unit subtracts a sum of a plurality of audio time increments from a sum of a plurality of video time increments, then divides a subtraction value by the number of frames for a correction period to detect the error.

2. The image processor of claim 1, wherein the audio data processing unit and the video data processing unit are included in a single DSP chip.

3. The image processor of claim 1, wherein the image capturing unit is a camera module.

4. A method of operating an image processor comprising:
   providing audio data and information on an audio time increment from an audio data processing unit having a timer;
   providing video data and information on a video time increment from a video data processing unit using a plurality of video frames generated through photographing;
   storing the audio data, the information on the audio time increment, the video data and the information on the video time increment; and
   detecting an error between the video time increment information provided from the video data processing unit and the audio time increment information provided from the audio data processing unit, and performing a correcting operation based on the detected error periodically,
   wherein the step of detecting the error further comprises:
   subtracting a sum of a plurality of audio time increments from a sum of a plurality of video time increments; and
   dividing a subtraction value by the number of frames for a correction period.

5. A portable terminal comprising:
   an AAC CODEC configured to provide audio data and information on an audio time increment;
   an image capturing unit configured to generate a plurality of video frames through photographing;
   an MPEG video CODEC for generating information on a video time increment of each video data using the plurality of video frames, and providing the video data and the information on the video time increment;
   a memory configured to store the audio data and the audio time increment information, and the video data and the video time increment information; and
   an error detecting unit to detect an error correcting value based on a time difference obtained by comparing an accumulated sum of a plurality of audio time increments provided from the AAC CODEC and an accumulated sum of a plurality of video time increments provided from the MPEG video CODEC, and correcting an error of the video time increment, wherein the error detecting unit subtracts a sum of a plurality of audio time increments from a sum of a plurality of video time increments, then divides a subtraction value by the number of frames for a correction period to detect the error.

6. The portable terminal of claim 5, wherein the error detecting unit divides the time difference by the number of video frames for a correction period.

7. A method of operating a portable terminal comprising:
generating video data having a plurality of frames per a second obtained through photographing;
encoding the generated video data and calculating a video time increment using a number of encoded video frames at an MPEG video CODEC;
storing the generated video data and the video time increment, and audio data provided from an AAC CODEC and an audio time increment; and
detecting errors between the video time increment information provided from the MPEG video CODEC and the audio time increment information provided from the AAC CODEC, and performing a correcting operation based on the detected errors regularly,
wherein the step of detecting the errors further comprises:
subtracting a sum of a plurality of audio time increments from a sum of a plurality of video time increments; and
dividing a subtraction value by the number of frames for a correction period.

8. The method of claim 7, wherein the video time increment is calculated by dividing one second by the number of frames per second.

9. The image processor according to claim 1, wherein the video data processing unit divides one second by the number of frames per second to generates the information on video time increment.

10. The method according to claim 4, wherein the video time increment is calculated by dividing one second by the number of frames per second.

11. The method according to claim 4, the step of performing correcting operation further comprising:
adding the divided subtraction value to the video time increment.

* * * * *